United States Patent
Zheng et al.

(10) Patent No.: US 12,526,028 B2
(45) Date of Patent: *Jan. 13, 2026

(54) BEAM SELECTION METHOD AND NETWORK ELEMENT

(71) Applicant: NTT DOCOMO, INC., Tokyo (JP)

(72) Inventors: Xufei Zheng, Beijing (CN); Liu Liu, Beijing (CN); Hiroyuki Kawai, Tokyo (JP); Lan Chen, Beijing (CN); Tianyang Min, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 18/269,442

(22) PCT Filed: Dec. 28, 2020

(86) PCT No.: PCT/CN2020/140145
§ 371 (c)(1),
(2) Date: Jun. 23, 2023

(87) PCT Pub. No.: WO2022/140914
PCT Pub. Date: Jul. 7, 2022

(65) Prior Publication Data
US 2024/0088973 A1    Mar. 14, 2024

(51) Int. Cl.
*H04B 7/06* (2006.01)
*H04W 24/10* (2009.01)

(52) U.S. Cl.
CPC ........ *H04B 7/0695* (2013.01); *H04W 24/10* (2013.01)

(58) Field of Classification Search
CPC ........ H04B 7/0695; H04B 7/06; H04W 24/10
See application file for complete search history.

(56) References Cited

U.S. PATENT DOCUMENTS

| | | | |
|---|---|---|---|
| 2013/0059619 A1* | 3/2013 | Kim | H04L 5/0051 455/509 |
| 2017/0141825 A1 | 5/2017 | Zhang et al. | |
| 2019/0053288 A1* | 2/2019 | Zhou | H04W 74/0833 |
| 2019/0349062 A1* | 11/2019 | Zhang | H04B 7/0617 |
| 2022/0014236 A1* | 1/2022 | Kosugi | H04B 7/022 |
| 2022/0158703 A1* | 5/2022 | Jiang | H04B 7/0634 |
| 2024/0063883 A1* | 2/2024 | Zheng | H04B 7/088 |

FOREIGN PATENT DOCUMENTS

| | | |
|---|---|---|
| EP | 4075843 A1 * 10/2022 | ............ H04W 24/10 |
| WO | 2018120102 A1 7/2018 | |

OTHER PUBLICATIONS

International Search Report issued in Application No. PCT/CN2020/140145, mailed on Sep. 28, 2021 (5 pages).

* cited by examiner

*Primary Examiner* — Deepa Belur
(74) *Attorney, Agent, or Firm* — Osha Bergman Watanabe & Burton LLP

(57) ABSTRACT

The present disclosure provides a beam selection method and a network element. The network element includes a first network element in a communication network, including: a receiving unit configured to receive measurement results of a terminal for first information transmitted via at least a part of first beams; a processing unit configured to determine a preferred beam from a plurality of second beams according to measurement results of the first information transmitted via more than two first beams; and a transmitting unit configured to transmit information about the preferred beam.

7 Claims, 4 Drawing Sheets

BEAM SELECTION METHOD AND NETWORK ELEMENT

TECHNICAL FIELD

The present disclosure relates to a field of wireless communication, and more particularly, to a method for beam selection and a corresponding network element.

BACKGROUND

In order to meet the extremely high data rate requirements of the evolved 5G NR, large-scale antenna arrays working in millimeter wave (mmWave) band have been regarded as a recommended technology in 5G communication. In a large-scale antenna array system, a large number of beams are used through beamforming technology to communicate between a base station and a terminal. On the other hand, application of large-scale antenna arrays brings many challenges and increases system complexity. For example, in order to achieve good communication effect, beam management is needed. Usually in beam management, an appropriate beam is selected to transmit data by beam measurement/reporting. When mmWave is used for communication, because beams generated by large-scale antenna arrays are narrow, signaling overhead in beam measurement is significantly increased.

In addition, in high-motility scenarios, beam status will change rapidly due to constant changes of a user's position and surrounding environment. It is difficult for existing beam measurement methods to keep up with such changes, resulting in degraded system performance For example, in an existing beam measurement method, the base station performs channel measurement by using reference signals such as Synchronization Signal Block (SSB) and Channel State Information Reference Signal (CSI-RS), and selects beams according to measurement results. Generally, the base station first carries out coarse-grained beam measurement using an SSB signal. Then, for a data channel, CSI-RS is used for further fine-grained beam measurement. This leads to a large amount of signaling overhead for large-scale antenna arrays working in mmWave band, and it is difficult to keep up with environment changes in high-mobility scenarios.

SUMMARY

According to an aspect of the present disclosure, a first network element is provided. The first network element in a communication network comprises: a receiving unit configured to receive measurement results of a terminal for first information transmitted via at least a part of first beams; a processing unit configured to determine a preferred beam from a plurality of second beams according to measurement results of the first information transmitted via more than two first beams; a transmitting unit configured to transmit information about the preferred beam.

According to another aspect of the present disclosure, a beam selection method applied to a first network element in a communication network is provided. The method comprises: receiving measurement results of a terminal for first information transmitted via at least a part of first beams; determining a preferred beam from a plurality of second beams according to measurement results of the first information transmitted via more than two first beams; transmitting information about the preferred beam.

BRIEF DESCRIPTION OF DRAWINGS

The above and other objects, features and advantages of the present disclosure will become more apparent by describing embodiments of the present disclosure in more detail in conjunction with accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals usually represent like parts or steps.

DETAILED DESCRIPTION

Figure 1A:
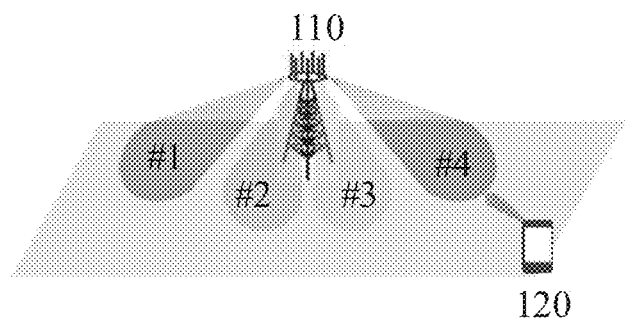
FIGS. 1A and 1B are schematic diagrams showing that a base station performs beam selection by measurements of SSB and CSI-RS.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure. In addition, terminals described herein may include various types of terminals, such as User Equipment (UE), mobile terminals (or referred to as mobile stations) or fixed terminals. However, for convenience, terminals and UE are sometimes used interchangeably hereinafter.

Figure 1B:
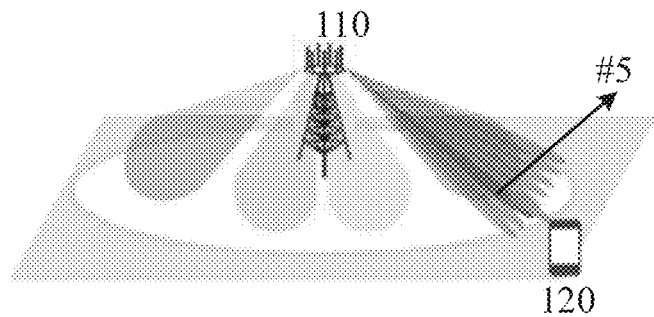

FIGS. 1A and 1B are schematic diagrams showing that a base station performs beam selection by measurements of SSB and CSI-RS. As shown in FIG. 1A, a base station 110 first transmits a synchronization signal to UE 120 through beams #1, #2, #3 and #4. Based on the received synchronization signal, UE 120 measures the beams #1, #2, #3 and #4 with wide coverage, and reports measurement results to the base station 110 to indicate that the measurement result of beam #4 is the best. Then, as shown in FIG. 1B, the base station 110 transmits a CSI-RS signal to the UE 120 through a plurality of beams with narrow coverage corresponding to the beam #104 according to the measurement results of the synchronization signal by the UE 120, and determines to use the beam #105 to transmit data to a user according to a measurement feedback of the UE 120 based on the CSI-RS signal.

In the methods shown in FIGS. 1A and 1B, the UE first needs to perform beam measurement on wide beams that transmit SSB (hereinafter referred to as "SSB beams"), and then perform beam measurement on narrower beams that transmit CSI-RS (hereinafter referred to as "CSI-RS beams"), and feed back measurement results to the base station respectively, so that the base station can determine the beam that is finally used to transmit data to the UE. This leads to a large signaling overhead and increased complexity of the system, and it is difficult to adapt to high-speed changes of UE location in scenarios with high-speed movement.

In order to solve the above problems, in the embodiments according to the present disclosure, a device at the network side can determine a second beam for transmitting data to the UE according to measurement results of a plurality of (i.e., more than two) first beams fed back by the UE, without obtaining measurement results of the user for the second beams.

In the following description of the embodiments, SSB beams as first beams and CSI-RS beams as second beams will be described as an example. However, it should be understood that the present disclosure is not limited thereto. For example, the first beams may be specific CSI-RS beams, and the second beams may be other CSI-RS beams different from the first beams. In addition, the first beams and the second beams may at least partially overlap in the coverage area. For example, a beam width of the first beams may be greater than that of the second beams, and one first beam may have a plurality of second beams corresponding to its coverage. For example, the first beams described above are SSB beams and the second beams are CSI-RS beams. Alternatively, the first beams and the second beams may not overlap, a second beam may be located between two adjacent first beams, and the beam width of the first beams is the same as that of the second beams. For example, both the first beams and the second beams are SSB beams or CSI-RS beams.

Figure 2:
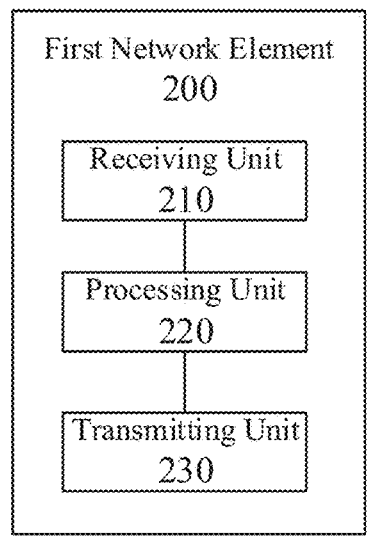
FIG. 2 is a schematic block diagram showing a first network element according to an embodiment of the present disclosure.

A first network element according to an embodiment of the present disclosure will be described below with reference to FIG. 2. FIG. 2 is a schematic block diagram showing a first network element according to an embodiment of the present disclosure. As shown in FIG. 2, a first network element 200 according to an embodiment of the present disclosure may include a receiving unit 210, a processing unit 220, and a transmitting unit 230. In addition to the receiving unit, the processing unit and the transmitting unit, the first network element 200 may further include other components, however, since these components are irrelevant to contents of the embodiments of the present disclosure, illustrations and descriptions thereof are omitted herein.

As shown in FIG. 2, the receiving unit 210 of the first network element 200 may receive measurement results of a terminal for first information transmitted via at least a part of the first beams. For example, in the case that the first beams are SSB beams transmitted by a base station to UE, the first information may be a primary synchronization signal PSS or a secondary synchronization signal SSS transmitted via the SSB beams. The receiving unit 210 may receive the measurement results of the terminal for the synchronization information transmitted via at least a part of the SSB beams. According to an example of the present disclosure, the at least part of SSB beams may be one or more SSB beams with the best signal quality determined by the UE according to configuration information. Alternatively, the at least part of SSB beams may be SSB beams randomly selected by the UE among the SSB beams according to the configuration information, or specific SSB beams indicated by the configuration information. In addition, the measurement results for the first information transmitted via at least a part of the first beams may be one or more of information reflecting channel quality, such as Reference Signal Received Power (RSRP), Reference Signal Received Quality (RSRQ), Signal Interference plus Noise Ratio (SINR), and the like. In particular, the measurement results may be measurement results fed back at layer L1 (e.g., feedback L1-RSRP, L1-RSRQ, L1-SINR, etc.), measurement results fed back at layer L2 (e.g., the number of beam failures, beam failure rate, etc.) or measurement results fed back at layer L3 (e.g., RSRP, RSRQ, SINR, etc.). In addition, the measurement results may include measurement results for a primary cell (PCell), a secondary cell (SCell) and a primary and secondary cell (PSCell). In addition, the measurement results may be measurement results of a serving cell, or measurement results of a neighbor cell.

The processing unit 220 determines a preferred beam from a plurality of second beams according to measurement results of the first information transmitted via more than two first beams. According to an example of the present disclosure, the processing unit 220 may determine the preferred beam from the plurality of second beams according to the measurement results of the first information transmitted via more than two first beams by utilizing a correlation between the first beams and the second beams obtained in advance. For example, the receiving unit 210 may receive first historical measurement results of the first beams and second historical measurement results of the second beams transmitted by the UE in advance. The processing unit 220 may obtain the correlation between the first beams and the second beams in advance at least according to the first historical measurement results of the first beams and the second historical measurement results of the second beams corresponding to the first historical measurement results. For example, according to the first historical measurement results of the first beams and the second historical measurement results of the second beams corresponding to the first historical measurement results, the processing unit 220 may learn that one or more second beams with the best signal quality among the plurality of second beams are preferred beams in the case that the measurement results of the first beams are specific values. In addition, the processing unit 220 may also determine a position, a speed, a moving direction, scheduling results of the user and the like according to the first historical measurement results of the first beams and the second historical measurement results of the second beams corresponding to the first historical measurement results.

According to another example of the present disclosure, the processing unit 220 trains a neural network in advance using training information such as the first historical measurement results of the first beams and the second historical measurement results of the second beams corresponding to the first historical measurement results, to obtain the correlation between the first beams and the second beams. The neural network may be any Deep Neural Networks (DNN) known to those skilled in the art, for example, Feedforward Neural Networks (FNN), Convolutional Neural Networks (CNN), Recurrent Neural Networks (RNN) and the like.

A terminal device may transmit measurement results of the first information transmitted by a plurality of first beams at once, and the processing unit 220 determines the preferred beam from the plurality of second beams according to the measurement results transmitted by the terminal device at once. Alternatively, the terminal device may only transmit a measurement result of the first information transmitted by one first beam at once. For example, the terminal device only feeds back a measurement result of a first beam with the best signal quality each time, or the terminal device only randomly feeds back a measurement result of one first beam each time. In this case, the processing unit 220 determines the preferred beam from the plurality of second beams according to a plurality of measurement results received from the terminal device within a period of time.

In addition, according to another example of the present disclosure, in order to adapt to scenarios where the terminal moves at a high speed, the processing unit 220 may also combine other information such as information related to the terminal's movement with the first historical measurement results and the second historical measurement results, to obtain the correlation between the first beams and the second beams, for example, under conditions such as that the terminal moves in a specific way. Accordingly, in a pre-learning stage, the receiving unit 210 may further receive historical terminal movement data associated with the first historical measurement results and the second historical measurement results. And in a practical application stage, the receiving unit 210 may receive movement data of the terminal. For example, the movement data of the terminal may be information such as a position, speed and moving direction of the terminal.

Then, the transmitting unit 230 transmits information about the determined preferred beam. Therefore, the first network element 200 may determine the second beam for transmitting data to the UE by using the measurement results fed back by the UE for the plurality of first beams, without obtaining measurement results of the user for the second beams.

According to an example of the present disclosure, the first network element 200 described above may be a network element in the 3GPP standard architecture. For example, the first network element 200 may be a network element centrally provided in a core network above a base station of a communication network or a component corresponding to the core network. As another example, the first network element 200 may be a network element distributed in a centralized unit (CU) and a distributed unit (DU) of a base station of a communication network.

Figure 3:
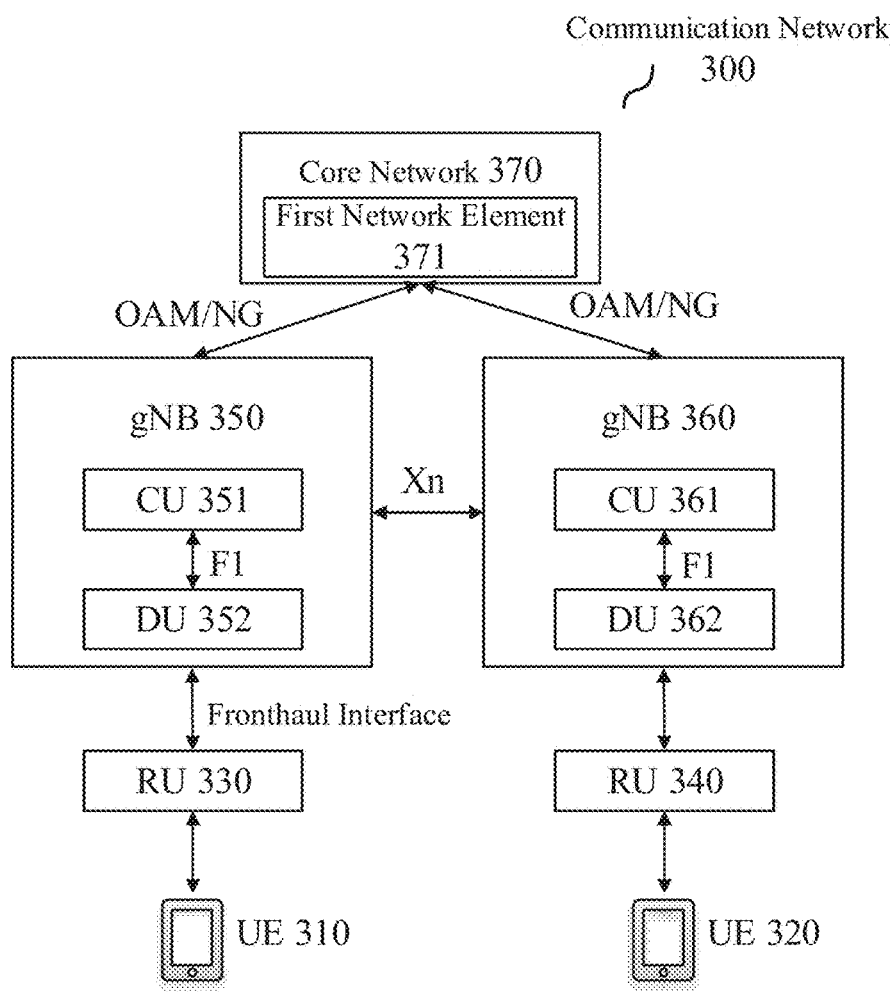
FIG. 3 is a schematic diagram showing a first network element centrally provided in a core network above a base station of a communication network.

Next, centrally providing the above-mentioned first network element in a core network above a base station or a component corresponding to the core network of a communication network of 3GPP standard will be illustrated with reference to FIG. 3. FIG. 3 is a schematic diagram showing a first network element centrally provided in a core network above a base station of a communication network. As shown in FIG. 3, a communication network 300 may include a UE 310, a UE 320, a radio unit (RU) 330, a radio unit 340, a gNB 350, a gNB 360, and a core network 370, where the gNB 350 includes a CU 351 and a DU 352, the gNB 360 includes a CU 361 and a DU 362, and the core network 370 includes a first network element 371. In addition, various elements in the communication network 300 may communicate with each other through corresponding interfaces, for example, communication between RU and gNB through an interface between RU and gNB, communication between CU and DU through an interface between CU and DU, communication between gNB and gNB through an interface between gNB and gNB, and communication between gNB and the core network through an interface between gNB and the core network. For example, as shown in FIG. 3, communication between RU and gNB may be achieved through a Fronthaul interface, communication between CU and DU may be achieved through an F1 interface, communication between the gNB 350 and the gNB 360 may be achieved through an Xn interface, and communication between gNB and the core network may be achieved through an OAM/NG interface. The communication network 300 may further include other network elements, however, since these components are irrelevant to the contents of the embodiments of the present disclosure, illustrations and descriptions thereof are omitted herein.

The receiving unit of the first network element 371 may receive the measurement results of the terminal for the first information transmitted via at least a part of the first beams. And optionally, the receiving unit of the first network element 371 may further receive movement information and other information. In particular, the UE 310 may transmit the measurement results of the first information transmitted via at least a part of the first beams, as well as the movement information and other information to the RU 330; the RU 330 may transmit the received information to the DU 352 through the Fronthaul interface; the DU 352 may transmit these information to the CU 351 through the F1 interface; and then the CU 351 may transmit the measurement results of the first information transmitted via at least a part of the first beams, as well as the movement information and other information to the first network element 371 through the OAM/NG interface. Similarly, the UE 320 may transmit the measurement results of the first information transmitted via at least a part of the first beams, as well as the movement information and other information to the RU 340; the RU 340 may transmit the received information to the DU 362 through the Fronthaul interface; the DU 362 may transmit these information to the CU 361 through the F1 interface; and then the CU 361 may transmit the measurement results of the first information transmitted via at least a part of the first beams, as well as the movement information and other information to the first network element 371 through the OAM/NG interface. In addition, the adjacent base stations gNB 350 and gNB 360 may also exchange measurement information, movement information and other information fed back by UEs in their respective cells through the Xn interface. For example, the movement information may be a sequence of Doppler frequency shift and channel quality information. In addition, other information may include information about channel quality or channel environment in addition to the above measurement results. For example, antenna height, antenna beam direction pattern, antenna tilt angle, building information near the location, and the like.

The processing unit of the first network element 371 determines the preferred beam from the plurality of second beams according to the measurement results of the first information received through the OAM/NG interface and transmitted via more than two first beams. As described above, the processing unit of the first network element 371 may train the neural network in advance according to at least the first historical measurement results of the first beams and the second historical measurement results of the second beams corresponding to the first historical measurement results, so as to obtain the correlation between the first beams and the second beams. In this case, the UE 310 may transmit training information such as the first historical measurement results of the first beams and the second historical measurement results of the second beams corresponding to the first historical measurement results to the RU 330; the RU 330 may transmit the received training information to the DU 352 through the Fronthaul interface; the DU 352 may transmit these information to the CU 351 through the F1 interface; and then the CU 351 may transmit the training information to the first network element 371 through the OAM/NG interface. Similarly, the UE 320 may transmit the training information such as the first historical measurement results of the first beams and the second historical measurement results of the second beams corresponding to the first historical measurement results to the RU 340; the RU 340 may transmit the received training information to the DU 362 through the Fronthaul interface; the DU 362 may transmit these information to the CU 361 through the F1 interface; and then the CU 361 may transmit the training information to the first network element 371 through the OAM/NG interface. In addition, the adjacent base stations gNB 350 and gNB 360 may also exchange training information transmitted by UEs in their respective cells through the Xn interface. Therefore, the first network element 371 may train the neural network by using training information such as the first historical measurement results of the first beams, the second historical measurement results of the second beams corresponding to the first historical measurement results, user mobility, antenna height, historical measurement results of adjacent cells, and so on, so as to obtain the correlation between the first beams and the second beams. Moreover, in practical application, the processing unit of the first network element 371 may determine the preferred beam from the plurality of second beams based on the measurement results of the UE for the first information transmitted via more than two first beams, by using the neural network in which the correlation between the first beams and the second beams is obtained in advance.

Then, the transmitting unit of the first network element 371 may transmit information about the determined preferred beam to a corresponding RU through a corresponding interface. For example, in the case where the first network element 371 determines the preferred beam from the plurality of second beams based on the measurement results transmitted by the UE 310, the first network element 371 may transmit the information about the determined preferred beam to the gNB 350 through the OAM/NG interface, After obtaining the information about the determined preferred beam, the CU 351 of the gNB 350 may forward the information to the DU 352 through the F1 interface, and the DU 352 may further forward the information to the RU 330 through the Fronthaul interface, so that the RU 330 may learn which second beam should be used for data transmission with the UE 310.

In the example shown in FIG. 3, the first network element 371 provided in the core network 370 is taken as an example for description. Alternatively, the first network element may be a Data Collection and Analytics (DCA) element located on an upper layer of the base station and provided independently of the core network. In this case, the first network element may communicate with the base station using an Itf interface. Information that the first network element interacts with the base station using the Itf interface, as well as information such as arrangement, communication interfaces and interaction of other network elements such as RU, DU, CU, etc. are the same as those in the example shown in FIG. 3, which are therefore not repeatedly described herein.

Figure 4:
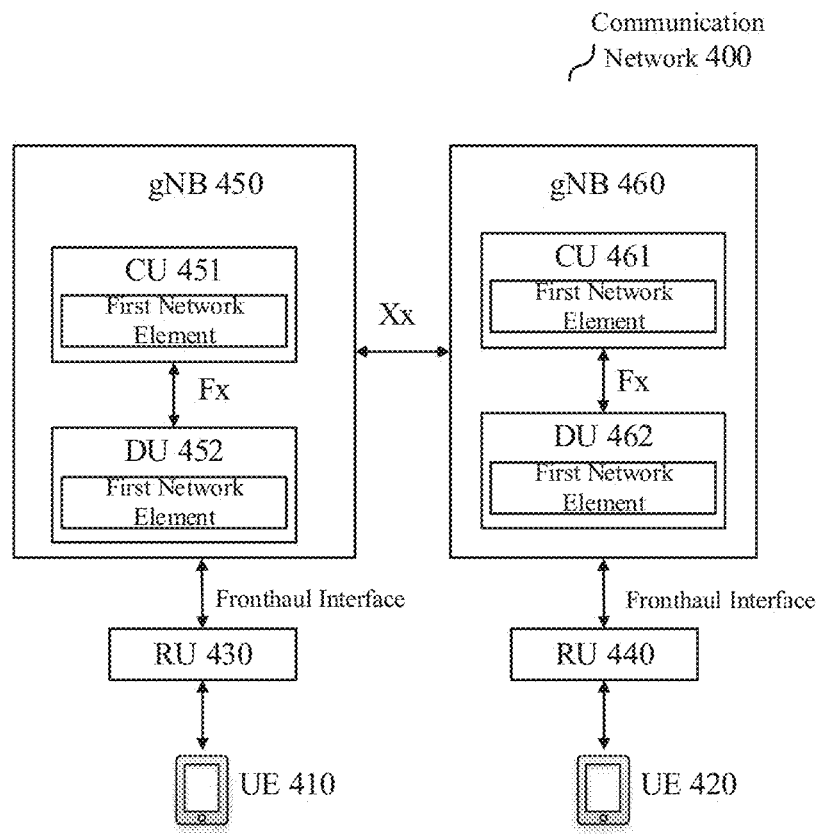
FIG. 4 is a schematic diagram showing that the first network element is distributed in a centralized unit (CU) and a distributed unit (DU) of a base station of a communication network.

Next, distributing the above-mentioned first network elements in a centralized unit (CU) and a distributed unit (DU) of a base station of a communication network of a 3GPP standard will be illustrated with reference to FIG. 4. FIG. 4 is a schematic diagram showing that the first network element is distributed in a centralized unit (CU) and a distributed unit (DU) of a base station of a communication network. As shown in FIG. 4, a communication network 400 may include a UE 410, a UE 420, a radio unit (RU) 430, a radio unit 440, a gNB 450 and a gNB 460, where the gNB 450 includes a CU 451 and a DU 452, the gNB 460 includes a CU 461 and a DU 462, and a first network element is provided in the CU 451, DU 452, CU 461 and DU 462, respectively. The first network element may be the above-mentioned Data Collection and Analysis (DCA) element. The communication network 400 may further include other network elements, however, since these components are irrelevant to the contents of the embodiments of the present disclosure, illustrations and descriptions thereof are omitted herein.

In addition, similar to the communication network 300, various elements in the communication network 400 may communicate with each other through corresponding interfaces. For example, as shown in FIG. 4, communication between RU and gNB may be achieved through a Fronthaul interface, communication between CU and DU having a first network element provided therein may be achieved through an Fx interface, and communication between the CU of the gNB 450 and the gNB 460 having a first network element provided therein may be achieved through an Xx interface.

The first network elements provided in the CU and DU may respectively perform the functions described above in connection with FIG. 2. The first network element provided in the CU and DU may determine the correlation between the first beams and the second beams according to different training information. For example, since CUs of adjacent base stations can exchange information through the Xx interface, the CUs can obtain measurement results of adjacent cells in addition to historical beam measurement information transmitted by the UEs through the Fx interfaces. Therefore, the correlation between the first beams and the second beams obtained in advance by the first network element in CU and DU may be different, and correspondingly, the preferred beam determined by CU and DU may be different in practice. Alternatively, the first network element in the DU may update the correlation between the first beams and the second beams it has obtained in advance according to the preferred beam determined by the first network element in the CU. On the other hand, using the first network element in the DU can determine the preferred beam more quickly and flexibly than using the first network element in the CU to determine the preferred beam.

Specifically, the receiving unit of the first network element may receive the measurement results of the terminal for the first information transmitted via at least a part of the first beams. And optionally, the receiving unit of the first network element may further receive movement information and other information, etc. More specifically, taking the first network element in the CU 451 and DU 452 as an example, the UE 410 may transmit the measurement results of the first information transmitted via at least a part of the first beams, as well as the movement information and other information to the RU 430; the RU 430 may transmit the received information to the DU 452 through the Fronthaul interface; and the DU 452 may transmit these information to the CU 451 through the Fx interface. In addition, CU 451 and CU 461 of adjacent base stations may also exchange measurement information, movement information and other information fed back by UEs in their respective cells through the Xx interface.

The processing unit of the first network element determines the preferred beam from the plurality of second beams according to the received measurement results of the UE 410 for the first information transmitted via more than two first beams. As described above, the processing unit of the first network element may train a neural network in advance according to at least the first historical measurement results of the first beams and the second historical measurement results of the second beams corresponding to the first historical measurement results, so as to obtain the correlation between the first beams and the second beams. In this case, the UE 410 may transmit training information such as the first historical measurement results of the first beams and the second historical measurement results of the second beams corresponding to the first historical measurement results to the RU 430; the RU 430 may transmit the received training information to the DU 452 through the Fronthaul interface; and the DU 452 may transmit these information to the CU 451 through the Fx interface. Therefore, the first network element in the CU 451 and DU 452 may train the neural network by using training information such as the first historical measurement results of the first beams, the second historical measurement results of the second beams corresponding to the first historical measurement results, user mobility, antenna height, historical measurement results of adjacent cells, and so on, so as to obtain the correlation between the first beams and the second beams. In addition, the CU 451 and CU 461 of adjacent base stations may also exchange training information transmitted by UEs in their respective cells through the Xx interface. Therefore, the first network element in the CU 461 may also train the neural network by using training information such as historical measurement results of neighboring cells, so as to obtain the correlation between the first beams and the second beams. In application, the processing unit of the first network element in the CU 451 and DU 452 may determine the preferred beam from the plurality of second beams based on the measurement results of the UE for the first information transmitted via more than two first beams, by using the neural network in which the correlation between the first beams and the second beams is obtained in advance.

Then, the transmitting unit of the first network element may transmit information about the determined preferred beam to a corresponding RU through a corresponding interface. For example, the first network element in the CU 451 may transmit the information about the determined preferred beam to the DU 352 through the Fx interface, and the DU 352 may further forward the information to the RU 330 through the Fronthaul interface. Furthermore, the first network element in the DU 452 may transmit the information about the determined preferred beam to the RU 330 through the Fronthaul interface, so that the RU 330 may learn which second beam should be used for data transmission with the UE 310.

Figure 5:
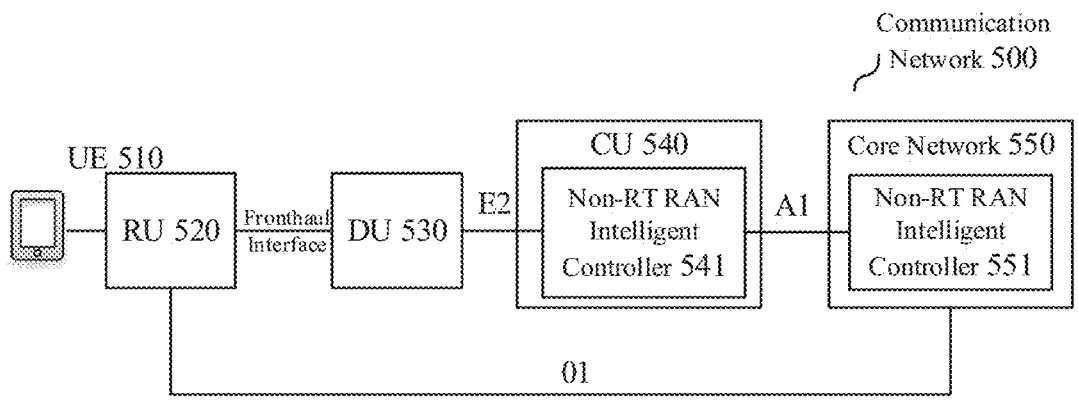
FIG. 5 is a schematic diagram showing that a first network element is provided in an O-RAN standard communication network.

According to another example of the present disclosure, the first network element 200 described above may be a network element in an O-RAN standard architecture. A first network element described above provided in an O-RAN standard communication network will be described below with reference to FIG. 5. FIG. 5 is a schematic diagram showing that a first network element is provided in an O-RAN standard communication network. As shown in FIG. 5, a communication network 500 may include a UE 510, a radio unit (RU) 520, a DU 530, a CU 540, and a core network (CN) 550, where a first network element is provided in the CU 540 and the CN 550, respectively. In particular, a near-RT RAN intelligent controller 541 is provided in the CU 540 as the first network element, and a non-RT RAN intelligent controller 551 is provided in the CN 550 as the first network element. The communication network 500 may further include other network elements, however, since these components are irrelevant to the contents of the embodiments of the present disclosure, illustrations and descriptions thereof are omitted herein.

In addition, as shown in FIG. 5, communication between the RU 520 and the DU 530 may be achieved through an open fronthaul interface, communication between the DU 530 and the near-RT RAN intelligent controller 541 may be achieved through an E2 interface, and communication between the near-RT RAN intelligent controller 541 and the non-RT RAN intelligent controller 551 may be achieved through an A1 interface. The RU 520 and the non-RT RAN intelligent controller 551 may also communicate through a 01 interface.

The near-RT RAN intelligent controller 541 and the non-RT RAN intelligent controller 551 may respectively perform the functions described above in connection with FIG. 2. The near-RT RAN intelligent controller 541 and the non-RT RAN intelligent controller 551 may determine the correlation between the first beams and the second beams according to different training information. The correlation between the first beams and the second beams obtained in advance by the near-RT RAN intelligent controller 541 and the non-RT RAN intelligent controller 551 may be different, and accordingly, the preferred beam determined by the near-RT RAN intelligent controller 541 and the non-RT RAN intelligent controller 551 may be different in application. Alternatively, the near-RT RAN intelligent controller 541 may update the correlation between the first beams and the second beams it has obtained in advance according to the preferred beam determined by the non-RT RAN intelligent controller 551. On the other hand, using the near-RT RAN intelligent controller 541 can determine the preferred beam more quickly and flexibly than using the non-RT RAN intelligent controller 551 to determine the preferred beam Specifically, the receiving unit of the first network element may receive the measurement results of the terminal for the first information transmitted via at least a part of the first beams. And optionally, the receiving unit of the first network element may further receive movement information and other information, etc. More specifically, the UE 510 may transmit the measurement results of the first information transmitted via at least a part of the first beams, as well as the movement information and other information to the RU 520; the RU 520 may transmit the received information to the DU 530 through the open Fronthaul interface; the DU 530 may transmit these information to the near-RT RAN intelligent controller 541 through the E2 interface; and the near-RT RAN intelligent controller 541 transmits these information to the non-RT RAN intelligent controller 551 through the A1 interface. In addition, the RU 520 may transmit the received information to the non-RT RAN intelligent controller 551 through the 01 interface.

The processing unit of the first network element determines the preferred beam from the plurality of second beams according to the received measurement results of the UE 510 for the first information transmitted via more than two first beams. As described above, the processing unit of the first network element may train a neural network in advance according to at least the first historical measurement results of the first beams and the second historical measurement results of the second beams corresponding to the first historical measurement results, so as to obtain the correlation between the first beams and the second beams. In this case, the UE 510 may transmit training information such as the first historical measurement results of the first beams and the second historical measurement results of the second beams corresponding to the first historical measurement results to the RU 520; the RU 520 may transmit the received training information to the DU 530 through the open Fronthaul interface; the DU 530 may transmit these information to the near-RT RAN intelligent controller 541 through the E2 interface; and the near-RT RAN intelligent controller 541 transmits these training information to the non-RT RAN intelligent controller 551 through the A1 interface. In addition, the RU 520 may transmit the received training information to the non-RT RAN intelligent controller 551 through the 01 interface.

The near-RT RAN intelligent controller 541 and the non-RT RAN intelligent controller 551 may train the neural network by using training information such as the first historical measurement results of the first beams, the second historical measurement results of the second beams corresponding to the first historical measurement results, user mobility, antenna height, historical measurement results of adjacent cells, and so on, so as to obtain the correlation between the first beams and the second beams. In application, the processing unit of the near-RI RAN intelligent controller 541 and the non-RT RAN intelligent controller 551 may determine the preferred beam from the plurality of second beams based on the measurement results of the UE for the first information transmitted via more than two first beams, by using the neural network in which the correlation between the first beams and the second beams is obtained in advance.

Then, the transmitting unit of the first network element may transmit information about the determined preferred beam to a corresponding RU through a corresponding interface. For example, the non-RT RAN intelligent controller 551 may transmit the information about the determined preferred beam to the near-RT RAN intelligent controller 541 through the A1 interface, the near-RT RAN intelligent controller 541 may transmit the information about the determined preferred beam to the DU 530 through the E2 interface; and the DU 530 may further forward the information to the RU 520 through the open Fronthaul interface. In addition, the non-RT RAN intelligent controller 551 may also transmit the information about the determined preferred beam to the RU 520 through the 01 interface, so that the RU 520 may learn which second beam should be used for data transmission with the UE 510.

Figure 6:
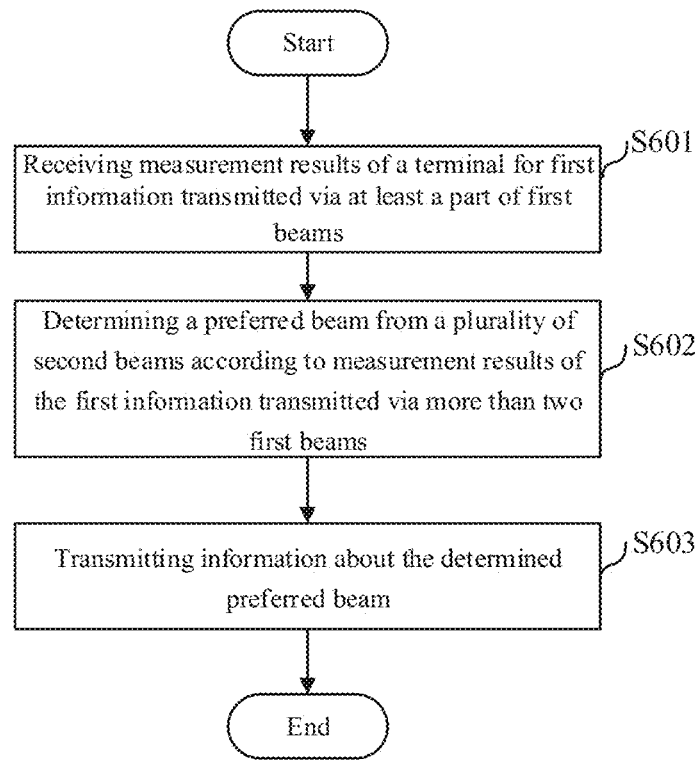
FIG. 6 is a flowchart of a beam selection method according to an embodiment of the present disclosure.

A beam selection method according to an embodiment of the present disclosure will be described below with reference to FIG. 6. FIG. 6 is a flowchart of a beam selection method 600 according to an embodiment of the present disclosure. Since steps of the beam selection method 600 correspond to the operations of the electronic device 200 described above with reference to the figure, a detailed description of the same content is omitted herein for the sake of simplicity.

As shown in FIG. 6, in step S601, measurement results of a terminal for first information transmitted via at least a part of first beams are received. For example, in the case that the first beams are SSB beams transmitted by a base station to UE, the first information may be a primary synchronization signal PSS or a secondary synchronization signal SSS transmitted via the SSB beams. The measurement results of the terminal for the synchronization information transmitted via at least a part of the SSB beams may be received in step S601. According to an example of the present disclosure, the at least part of SSB beams may be one or more SSB beams with the best signal quality determined by the UE according to configuration information. Alternatively, the at least part of SSB beams may be SSB beams randomly selected by the UE among the SSB beams according to the configuration information, or specific SSB beams indicated by the configuration information. In addition, the measurement results for the first information transmitted via at least a part of the first beams may be one or more of information reflecting channel quality, such as Reference Signal Received Power (RSRP), Reference Signal Received Quality (RSRQ), Signal Interference plus Noise Ratio (SINR), and the like. In particular, the measurement results may be measurement results fed back at layer L1 (e.g., feedback L1-RSRP, L1-RSRQ, L1-SINR, etc.), or measurement results fed back at layer L2 or layer L3 (e.g., L3-RSRP). In addition, the measurement results may include measurement results for a primary cell (PCell), a secondary cell (SCell) and a primary and secondary cell (PSCell). In addition, the measurement results may be measurement results of a serving cell, or measurement results of a neighbor cell.

In step S602, a preferred beam is determined from a plurality of second beams according to measurement results of the first information transmitted via more than two first beams. According to an example of the present disclosure, in step S602, the preferred beam may be determined from the plurality of second beams according to the measurement results of the first information transmitted via more than two first beams by utilizing a correlation between the first beams and the second beams obtained in advance. For example, the beam selection method 600 may further comprises receiving first historical measurement results of the first beams and second historical measurement results of the second beams transmitted by the UE in advance. Then, the correlation between the first beams and the second beams may be obtained in advance at least according to the first historical measurement results of the first beams and the second historical measurement results of the second beams corresponding to the first historical measurement results. For example, according to the first historical measurement results of the first beams and the second historical measurement results of the second beams corresponding to the first historical measurement results, signals transmitted via which second beam among the plurality of second beams have the best signal quality may be learned in the case that the measurement results of the first beams are specific values.

According to another example of the present disclosure, the beam selection method 600 may further comprises training a neural network in advance using training information such as the first historical measurement results of the first beams and the second historical measurement results of the second beams corresponding to the first historical measurement results, to obtain the correlation between the first beams and the second beams. The neural network may be any Deep Neural Networks (DNN) known to those skilled in the art, for example, Feedforward Neural Networks (FNN), Convolutional Neural Networks (CNN), Recurrent Neural Networks (RNN) and the like.

In addition, a terminal device may transmit measurement results of the first information transmitted by a plurality of first beams at once, and in step S602, the preferred beam may be determined from the plurality of second beams according to the measurement results transmitted by the terminal device at once. Alternatively, the terminal device may only transmit a measurement result of the first information transmitted by one first beam at once. For example, the terminal device only feeds back a measurement result of a first beam with the best signal quality each time, or the terminal device only randomly feeds back a measurement result of one first beam each time. In this case, the preferred beam may be determined from the plurality of second beams according to a plurality of measurement results received from the terminal device within a period of time in step S602.

In addition, according to another example of the present disclosure, in order to adapt to scenarios where the terminal moves at a high speed, information related to the terminal's movement and other information about channel quality or channel environment in addition to the above measurement results may be combined with the first historical measurement results and the second historical measurement results, to obtain the correlation between the first beams and the second beams, for example, under conditions such as that the terminal moves in a specific way. Accordingly, in a pre-learning stage, historical terminal movement data associated with the first historical measurement results and the second historical measurement results may also be received. And in a practical application stage, the beam selection method 600 may further comprises receiving movement data of the terminal. For example, the movement data of the terminal may be information such as a position, speed and moving direction of the terminal.

Then, in step S603, information about the determined preferred beam is transmitted. Therefore, a device at the network side in the embodiment of the present disclosure may determine the second beam for transmitting data to the UE by using the measurement results fed back by the UE for the plurality of first beams, without obtaining measurement results of the user for the second beams.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 7:
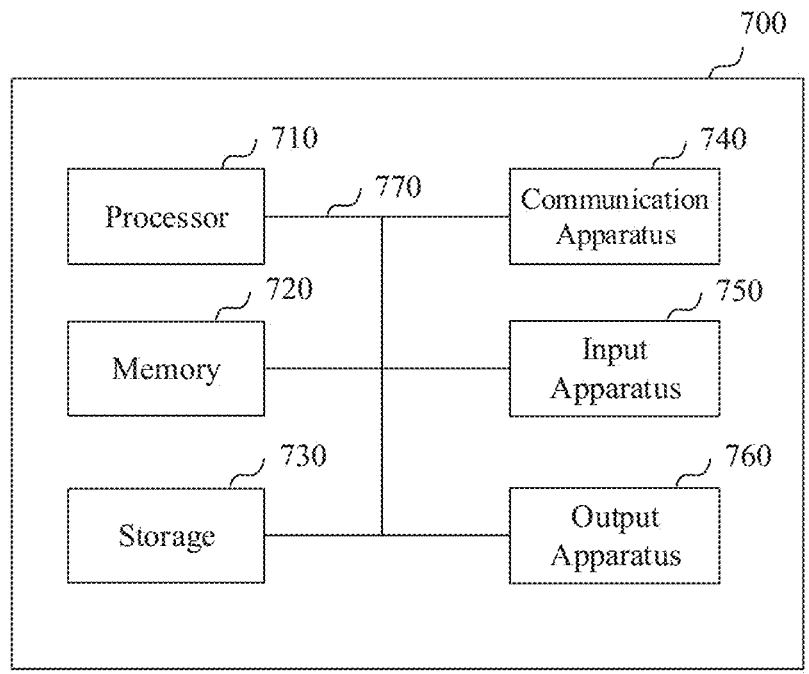
FIG. 7 is a schematic diagram of a hardware structure of a device involved in an embodiment of the present disclosure.

For example, a first network element in an embodiment of the present disclosure may function as a computer that executes the processes of the wireless communication method of the present disclosure. FIG. 7 is a schematic diagram of a hardware structure of a device 700 (a first network element) involved in an embodiment of the present disclosure. The above device 700 (a first network element) may be constituted as a computer apparatus that physically comprises a processor 710, a memory 720, a storage 730, a communication apparatus 740, an input apparatus 750, an output apparatus 760, a bus 770 and the like In addition, in the following description, terms such as "apparatus" may be replaced with circuits, devices, units, and the like. The hardware structure of a first network element may include one or more of the respective apparatuses shown in the figure, or may not include a part of the apparatuses.

For example, only one processor 710 is illustrated, but there may be multiple processors. Furthermore, processes may be performed by one processor, or processes may be performed by more than one processor simultaneously, sequentially, or with other methods. In addition, the processor 710 may be installed by more than one chip.

Various functions of the device 700 may be implemented, for example, by reading specified software (program) on hardware such as the processor 710 and the memory 720, so that the processor 710 performs computations, controls communication performed by the communication apparatus 740, and controls reading and/or writing of data in the memory 720 and the storage 730.

The processor 710, for example, operates an operating system to control the entire computer. The processor 710 may be constituted by a Central Processing Unit (CPU), which includes interfaces with peripheral apparatuses, a control apparatus, a computing apparatus, a register and the like. For example, the processing unit described above may be implemented by the processor 710.

In addition, the processor 710 reads programs (program codes), software modules and data and the like from the storage 730 and/or the communication apparatus 740 to the memory 720, and execute various processes according to them. As for the program, a program causing computers to execute at least a part of the operations described in the above embodiments may be employed. For example, the processing unit of the first network element may be implemented by a control program stored in the memory 720 and operated by the processor 710, and other functional blocks may also be implemented similarly.

The memory 720 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 720 may also be referred to as a register, a cache, a main memory (a main storage apparatus) and the like. The memory 720 may store executable programs (program codes), software modules and the like for implementing a method involved in an embodiment of the present disclosure.

The storage 730 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 730 may also be referred to as an auxiliary storage apparatus.

The communication apparatus 740 is a hardware (transceiver device) performing communication between computers via a wired and/or wireless network, and is also referred to as a network device, a network controller, a network card, a communication module and the like, for example. The communication apparatus 740 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 740.

The input apparatus 750 is an input device (e.g., a keyboard, a mouse, a microphone, a switch, a button, a sensor and the like) that receives input from the outside. The output apparatus 760 is an output device (e.g., a display, a speaker, a Light Emitting Diode (LED) light and the like) that performs outputting to the outside. In addition, the input apparatus 750 and the output apparatus 760 may also be an integrated structure (e.g., a touch screen).

Furthermore, the respective apparatuses such as the processor 710 and the memory 720 are connected by the bus 770 that communicates information. The bus 770 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 710 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Blocks (MIBs), System Information Blocks (SIBs), etc.), Medium Access Control (MAC) signaling), other signals or combinations thereof.

In addition, physical layer signaling may also be referred to as L/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS) ", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by a first communication device and a second communication device.

In this specification, specific actions configured to be performed by the base station sometimes may be performed by its upper nodes in certain cases. Obviously, in a network composed of one or more network nodes having base stations, various actions performed for communication between terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM®), Code Division Multiple Access 3000 (CDMA 3000), Ultra Mobile Broadband (UMB), IEEE 920.11 (Wi-Ti®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as"first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification sometimes encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. A first network device in a communication network, comprising:
   a receiver configured to receive measurement results of a terminal for first information transmitted via at least a part of first beams;
   a processor configured to determine a preferred beam from a plurality of second beams according to measurement results of the first information transmitted via more than two first beams;
   a transmitter configured to transmit information about the preferred beam;
   the processor determines the preferred beam from the plurality of second beams according to the measurement results of the first information transmitted via more than two first beams by utilizing a correlation between the first beams and the second beams obtained in advance; wherein the receiver is further configured to receive first historical measurement results of the first beams and second historical measurement results of the second beams, and the processor obtains the correlation between the first beams and the second beams in advance at least according to the first historical measurement results of the first beams and the second historical measurement results of the second beams corresponding to the first historical measurement results.

2. The first network device of claim 1, wherein the first network device is a network device provided in a core network above a base station of the communication network or a component corresponding to the core network, the receiver receives the measurement results of the terminal forwarded by the base station for the first information transmitted via the at least part of the first beams, and the transmitter transmits the information about the preferred beam to the base station.

3. The first network device of claim 2, wherein the first network device is a data analysis device independently provided in a component corresponding to the core network above the base station of the communication network, or the first network device is an element a device provided in the core network above the base station of the communication network.

4. The first network device of claim 1, wherein the first network device is an intelligent analysis device provided in at least one of a centralized unit and a distributed unit of a base station.

5. The first network device of claim 1, wherein the first network device is a wireless intelligent controller provided in at least one of a centralized unit and a core network.

6. The first network device of claim 5, wherein the receiver receives the measurement results of the terminal forwarded by a distributed unit for the first information transmitted via the at least part of the first beams, and the transmitter transmits the information about the preferred beam to the distributed unit.

7. A beam selection method applied to a first network device in a communication network, the method comprising:

receiving measurement results of a terminal for first information transmitted via at least a part of first beams;

determining a preferred beam from a plurality of second beams according to measurement results of the first information transmitted via more than two first beams;

transmitting information about the preferred beam;

the determining a preferred beam from a plurality of second beams according to measurement results of the first information transmitted via more than two first beams includes:

determining the preferred beam from the plurality of second beams according to the measurement results of the first information transmitted via more than two first beams by utilizing a correlation between the first beams and the second beams obtained in advance, comprising:

receiving first historical measurement results of the first beams and second historical measurement results of the second beams, and obtaining the correlation between the first beams and the second beams in advance at least according to the first historical measurement results of the first beams and the second historical measurement results of the second beams corresponding to the first historical measurement results.

* * * * *